(12) United States Patent
Kim et al.

(10) Patent No.: US 9,568,747 B2
(45) Date of Patent: Feb. 14, 2017

(54) SIDE SHIELD FIXING STRUCTURE HAVING PIN-DETACHMENT GUIDE MEMBER

(71) Applicants: Hee Duk Kim, Gyeongsangbuk-do (KR); Seong Chan Kim, Daegu (KR)

(72) Inventors: Hee Duk Kim, Gyeongsangbuk-do (KR); Seong Chan Kim, Daegu (KR)

(*) Notice: Subject to any disclaimer, the term of this patent is extended or adjusted under 35 U.S.C. 154(b) by 123 days.

(21) Appl. No.: 14/312,027

(22) Filed: Jun. 23, 2014

(65) Prior Publication Data

US 2014/0375944 A1 Dec. 25, 2014

(30) Foreign Application Priority Data

Jun. 25, 2013 (KR) ........................ 10-2013-0073100

(51) Int. Cl.
*G02C 11/00* (2006.01)
*G02C 5/14* (2006.01)
*G02C 13/00* (2006.01)

(52) U.S. Cl.
CPC ................. *G02C 11/12* (2013.01); *G02C 5/14* (2013.01); *G02C 13/00* (2013.01)

(58) Field of Classification Search
CPC ........... G02C 5/2281; G02C 7/16; G02C 9/00; G02C 11/12; G02C 5/14; G02C 13/00
USPC ......... 351/42, 141, 44, 47, 121; 2/15, 12, 13
See application file for complete search history.

(56) References Cited

U.S. PATENT DOCUMENTS

| 5,798,815 A * | 8/1998 | Hirschman | A61F 9/029 351/121 |
| 6,270,216 B1 * | 8/2001 | DiChiara | A61F 9/02 351/121 |
| 6,644,803 B1 * | 11/2003 | Jung | G02C 7/16 351/121 |
| 6,715,873 B2 * | 4/2004 | Nahmias | G02C 7/16 351/44 |
| 2013/0215381 A1 * | 8/2013 | Raghuprasad | G02C 5/2281 351/178 |

FOREIGN PATENT DOCUMENTS

KR 20-0350660 Y1 5/2004

* cited by examiner

*Primary Examiner* — Zachary Wilkes
(74) *Attorney, Agent, or Firm* — Novick, Kim & Lee, PLLC; Jae Youn Kim

(57) ABSTRACT

Disclosed is a pin-detachment guide member for fixing a side shield which is capable of easily fixing or detaching the side shield to or from glasses. The pin-detachment guide member includes an inserting protrusion (400) having a screw thread and integrally formed with one surface of the temple (A) of glasses, and a pin-detachment guide member (300) introduced into an inner space of the upper and lower wings (D and E) which overlap with each other in a vertical direction of the inserting protrusion (400), such that the pin-detachment guide member (300) is screw-coupled with the inserting protrusion (400).

3 Claims, 10 Drawing Sheets

FIG.2        PRIOR ART

SIDE SHIELD FIXING STRUCTURE HAVING PIN-DETACHMENT GUIDE MEMBER

BACKGROUND

The present invention relates to a side shield applicable to industrial glasses, and more particularly, to a side shield fixing structure capable of easily fixing or detaching a side shield to or from glasses.

Generally, if glasses are worn, spaces between the temples and frames of glasses are inevitably spaced apart from a face. Due to such a separation phenomenon, sizes of gaps are formed between a face and temples, so that external foreign substances may be introduced through the gaps to the face of a wearer. Specifically, since a more lot of foreign substances exist in environments of industrial fields, it is very concerned to wound eyes of a labor so that visual disability may be caused.

In addition, when work such as welding work is performed in an industrial field, a worker wears industrial glasses in order to prevent his eyes from being wounded by foreign materials such as fragments or flames. However, even if such industrial glasses are worn, foreign materials such as fragments or flames are introduced through the spaces formed at left and right sides of the glasses so that the eyes of a worker may be wounded.

So, in order to prevent the negligent accident described above, side shields are installed to the hinges of left and right temples so that foreign substances are prevented from being introduced.

That is, the side shields are installed through the spaces between the temples and the frame of glasses so that foreign substances are prevented from being introduced to a face as well as eyes. According to the related art, an install hole is formed in an adhesive surface of a side shied and a screw is coupled to one of the temples of glasses through the adhesive hole to fix the side shield to the temple of glasses.

However, according to the related art of fixing the side shield through a screw coupling scheme described above, an error rate is high, workability is worse, and it is difficult to prevent glasses from being damaged because the hole is directly formed in the temple of glasses.

An example of the related art is disclosed in Korean utility model application No. 20-2004-2017 entitled "Structure of fixing side shield for glasses".

The structure of fixing a side shield for glasses includes through-holes formed at upper and lower portions of a rear part of the side shield surrounding the temple of glasses, and a fixing member having an elastic member therein and hooks formed at upper and lower ends thereof. While the fixing member is inserted through an opening of the side shield such that the fixing member is coupled to the through holes, the elastic member adheres elastically and closely to the temple of glasses.

However, according to the example of the related art, since the hooks of the fixing member are inserted into the though holes from the inside to the outside of the side shield, it is very inconvenient to disassemble the fixing member to separate the side shield from the temple of glasses. That is, when the fixing member is disassembled, since the fixing member is drawn back by one tool held by one hand in order to be disassembled in state that the elastic member of the fixing member is pressed by another tool held by the other hand, the convenience in use is not at all taken into consideration.

FIGS. 1 and 2 are views showing one example of a side shield according to the related art.

As shown in FIG. 1, through holes 22 are formed at upper and lower portions in a rear part of the side shield 2 surrounding the temple of glasses and a fixing member including a pushing support 102 at an inside thereof and hooks 101 formed at upper and lower ends thereof is inserted through an opening 21 of the side shield 2, so that the pushing support 102 is pressed by the temple 3 of glasses while the hooks 101 of the fixing member 1 are coupled into the through holes 22.

Therefore, as shown in FIG. 2, after the temple 3 of glasses is placed in the side shield 2 of the related art to allow the side shield 2 to surround the temple 3, the fixing member 1 is inserted into the opening 21 of the side shield 2 such that both hooks 101 of the fixing member 1 are coupled into the upper and lower through-holes 22 of the side shield. Thus, the pressing support 102 prepared between both hooks 101 of the fixing member 1 presses the temple 3 of the glasses, so that the side shield 2 may be coupled to the temple 3 of glasses.

According to the side shield having the above-described structure, after a user fit inserts the side shield with the flame of glasses, the fixing member is inserted into the side shield to press the temple of glasses to fix the side shield to the temple. Thus, the side shield is firmly coupled between the temple and the frame of the glasses. In addition, since the side shield is assembled in such a manner of inserting the hooks of the fixing member into the through holes formed in the side shield, anyone can conveniently and easily install and use the side shield. In advance, since the fixing member is depressed and disposed corresponding to a size of the side shield, there is an advantage of providing a neat shape.

Nevertheless, in the above described structure, when both hooks of the fixing member are inserted and fixed to the through-holes of the side shield after the side shield is installed to the temple, the assembly is quickly and easily completed due to inclined surfaces prepared on the hooks. However, the structure involves a disadvantage that it is difficult to inversely disassemble the fixing member from the side shield. That is, when the fixing member is inserted into the side shield through the opening to fix the side shield to the temple after the temple is placed in the side shield, the hooks formed at both sides of the fixing member are fitted into the through-holes of the side shield. When the hooks of the fixing member is latched and fixed into the through holes, due to the hooks having an inverted triangle shape, it is impossible to disassemble the fixing member from the side shield. If the fixing member is disassembled by force, the hooks of the fixing member and the through holes of the side shield may be damaged.

As a result, if once the side shield according to the related art is assembled, it is very inconvenient to disassemble the side shield, so that use of the side shield is very complicated and it is very concerned that the side shield may be damaged in disassembly, so it is concerned to give rise to waste of the cost due to repurchasing the side shield.

SUMMARY

To solve the problems described above, it is an object of the present invention to provide, an object of the present invention is to provide a side shield fixing structure having a pin-detachment guide member, which is capable of fixing a side shield to glasses and easily and conveniently removing a pin type member used for fixing the side shield to the glasses.

To achieve the object, there is provided a side shield fixing structure including a pin-detachment guide member. The side shield fixing structure includes a side shield fixed to a temple of glasses by vertically coupling a pin-detachment guide member inside the side shield through an inserting member divided into upper and lower wings; an inserting protrusion having a screw thread and integrally formed on one surface of the temple of glasses, wherein the pin-detachment guide member is introduced into an inner space of the upper and lower wings which overlap with each other in a vertical direction of the inserting protrusion such that the pin-detachment guide member is screw-coupled with the inserting protrusion while the pin-detachment guide member is sequentially introduced into the upper and lower wings, wherein the pin-detachment guide member, which is introduced into insides of the inserting member and the inserting protrusion, is separated by a continuous rotation operation of a user, so that apart thereof remains in the inserting member C and the inserting protrusion. Thus, the upper and lower wings of the inserting member are restricted to each other so that the side shield is coupled to the temple of the glasses.

The pin-detachment guide member includes a knob rotatable by a hand of a user; a detachable member detached and restricted in inner spaces of the upper and lower wings of the inserting member and the inserting protrusion as the knob is rotated; and a separation part interposed between the knob and the detachable member to be separated according to left and right torsions applied thereto.

The detachable member includes a lower inserting part introduced into the lower wing of the inserting member and restricted in the lower wing; an upper inserting part introduced into the upper wing of the inserting member and restricted in the upper wing; and a screw part disposed between the upper and lower inserting parts and engaged with the screw thread formed in the inserting protrusion.

In addition, a bottom surface of the lower inserting part includes an operating groove having an 'I' shape or a cross shape for detachment of the detachable member.

According to the side shield fixing structure having a pin-detachment guide member of the present invention, due to the detachable structure of the knob and the detachable member, the side shield can be firmly fixed to the temple of glasses and when the knob is twisted, the detachable member is separated from the knob, so that the separated detachable member remains in the state that the detachable member is introduced into the inserting member of the side shield and the inserting protrusion, so the side shield can be more conveniently fixed to the temple of glasses.

Specifically, according to the present invention, the coupled detachable member for fixing the side shield is detachable without difficulty due to the operating groove provided on the bottom surface of the detachable member. That is, the detachable member can be quickly detached by using the operating groove with a separated tool (such as a driver).

As a result, since the pin-detachment guide member for fixing aside shield according to the present invention allows the side shield to be conveniently installed to the temple and enables the detachable member previously installed to be separated, the pin-detachment guide member allows the side shield to be conveniently installed to glasses and the detachable member of a screw pin type, which is an object used to fix the side shield, can be more removed in a more easy scheme.

DETAILED DESCRIPTION OF THE EMBODIMENTS

Figure 1:
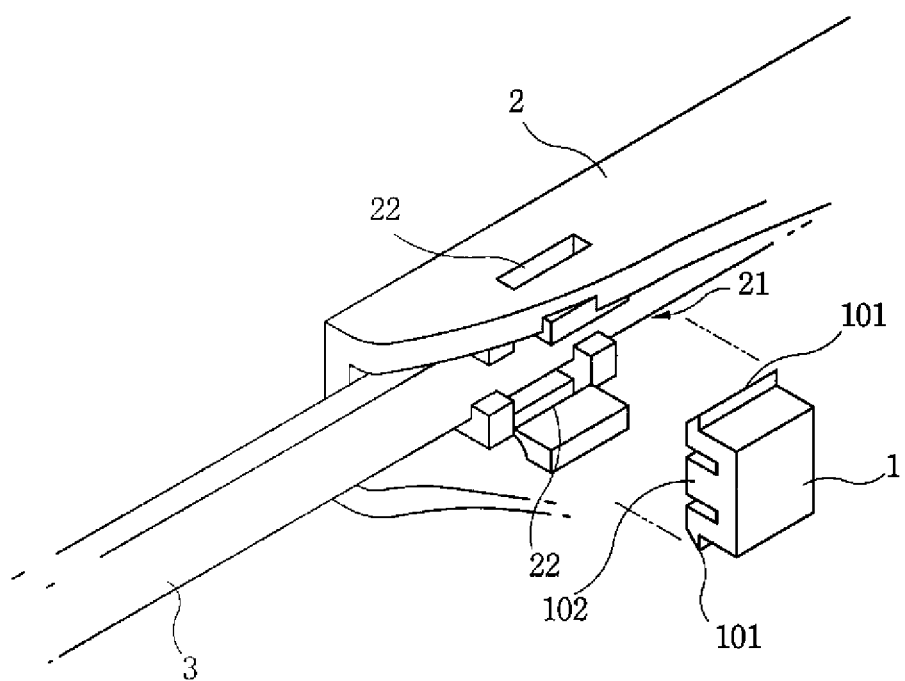
FIGS. 1 and 2 are views showing a side shield structure according to the related art.
Figure 2:
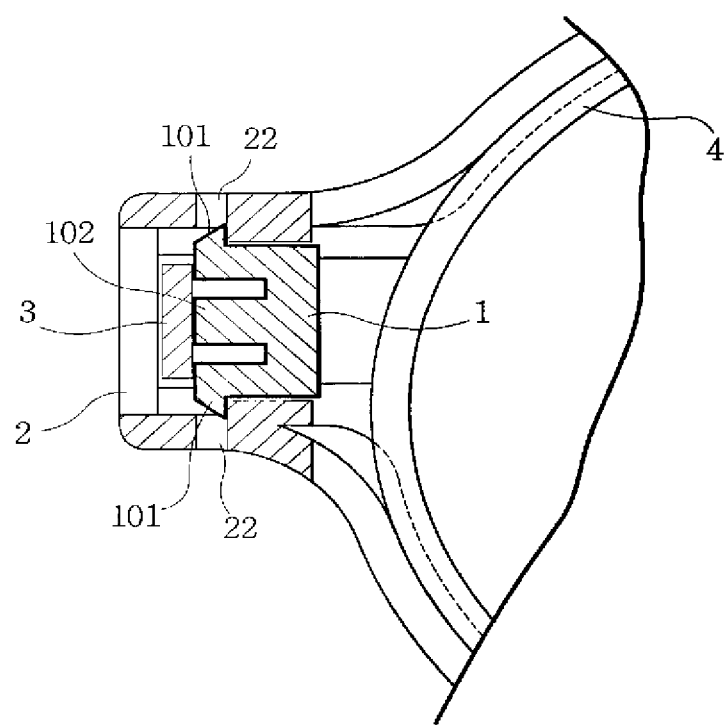

Hereinafter, the present invention will be described with reference to the accompanying drawings. The configuration, operation and effect of the present invention will be described with reference to preferable embodiments in detail.

The advantages, the features, and schemes of achieving the advantages and features of the present invention will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims. The same reference numerals denote the same elements throughout the specification.

Figure 4:
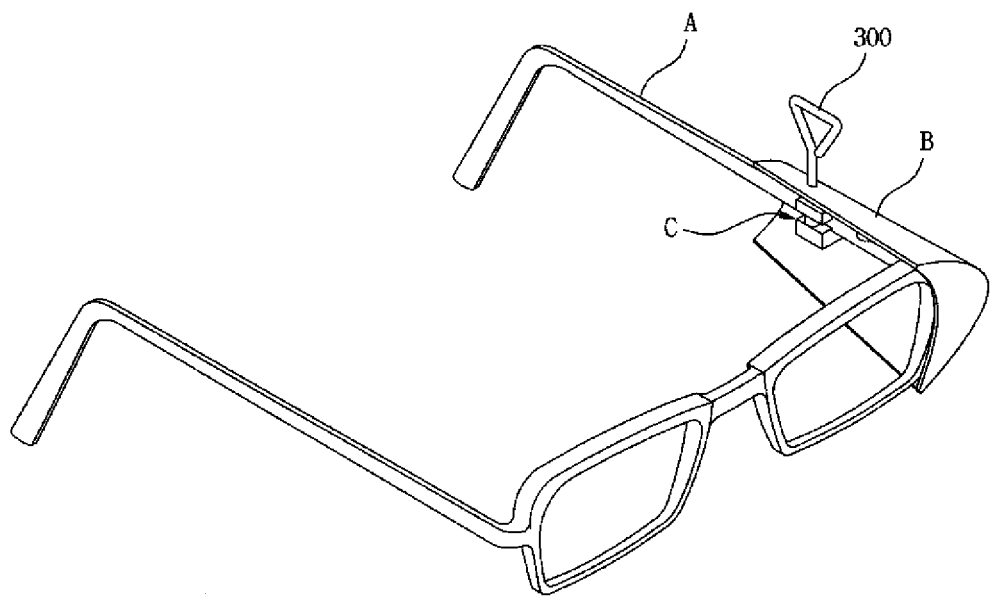
FIG. 4 is a view illustrating a state of using a pin-detachment guide member according to an embodiment of the present invention.
Figure 5:
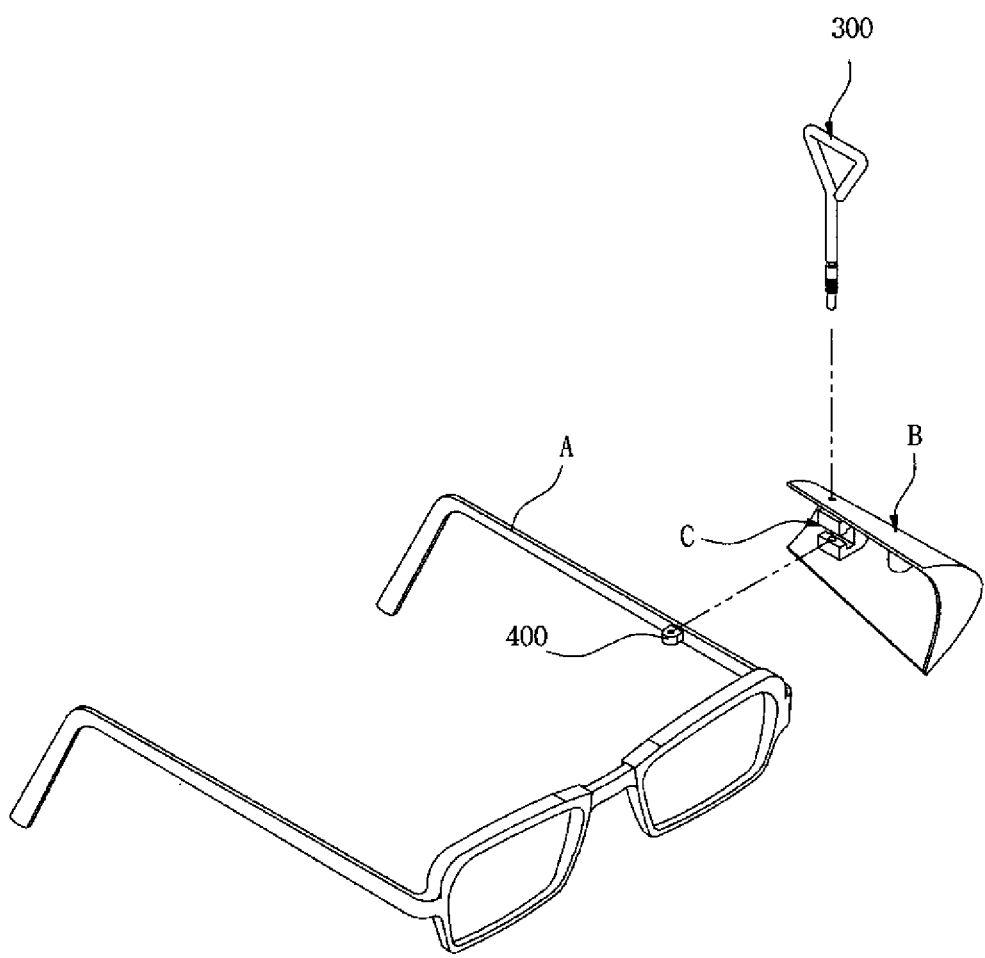
FIG. 5 is an exploded perspective view of a core portion of FIG. 4.

FIG. 4 is a view illustrating a state of using a pin-detachment guide member according to an embodiment of the present invention. FIG. 5 is an exploded perspective view of a core portion of FIG. 4.

The present invention relates to a side shield B applicable to industrial glasses.

Specifically, it should be understood that the present invention relates to a pin-detachment guide member 300 capable of fixing and detaching more easily and conveniently the side shield B to and from glasses.

As shown in FIGS. 4 and 5, the pin-detachment guide member 300 may be widely applied to industrial glasses as well as conventional glasses. For example, when the pin-detachment guide member 300 is applied to glasses as shown in FIG. 4, the side shield B is installed to the temple of glasses for the purpose of protecting the eyes and face of a wearer, so that the intended goal may be achieved.

That is, the pin-detachment guide member 300 is provided to solve the problems that an error rate is high and workability is degraded since the side shield is fixed through a screw coupling scheme, glasses may be damaged because the hole is directly formed in the temple of glasses, it is very inconvenient to disassemble the side shield if once the side shield is assembled because the convenience in use is not at all considered, the use of the side shield is very complicated, and the side shield may be damaged upon dissembling the side shield so that the extra cost for repurchasing the side shield may be required.

First, in the pin-detachment guide member 300 of the present invention, the side shield B includes an inserting member C having upper and lower wings D and E and formed on an inside surface thereof. The side shield B is fixed to the temple of glasses by allowing the pin-detachment guide member 300 to perforate into the inserting member C in up and down directions. In this case, an inserting protrusion 400 is further provided to the temple A to induce the side shield B to be intimately coupled to the temple A and it will be described below.

The inserting member C, into which the temple is inserted and fixed, is a conventional inserting member. In addition, the inserting member C may be divided into upper and lower wings D and E for the purpose of convenience of the description. An upper inserting part 322 of the pin-detachment guide member 300 is disposed in the upper wing D and a lower inserting part 321 of the pin-detachment guide member 300 is disposed in the lower wing E. To this end, it is preferable that the lower wing and the lower inserting part have coupling holes (to which any reference numerals are not assigned), of which diameters are narrower than those of coupling holes of the upper wing and the upper inserting part.

Figure 3:
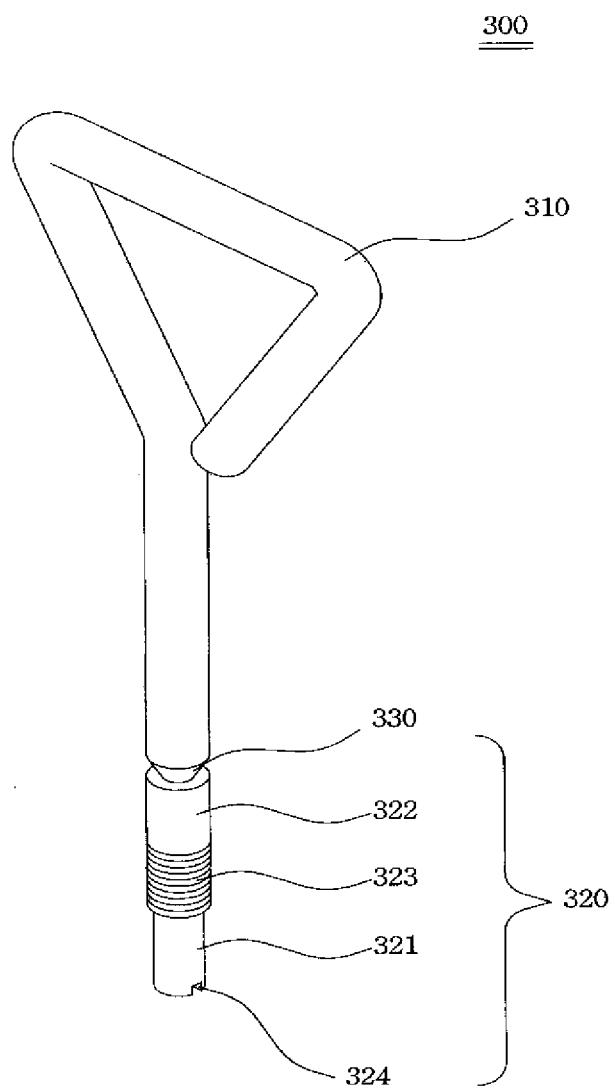
FIG. 3 is a perspective view showing a pin-detachment guide member for fixing a side shield according to an embodiment of the present invention.

FIG. 3 is a perspective view showing the pin-detachment guide member for fixing a side shield according to an embodiment of the present invention.

As shown in FIG. 3, the pin-detachment guide member 300 includes a knob 310 held by a hand of a user, a detachable member 320 restricted in inner spaces of the upper and lower wings D and E of the inserting member C and the inserting protrusion 400 when the detachable member 320 is separated by a rotation of the knob 310, and a separation part 330 interposed between the knob and the detachable member to be separated by torsion of left and right rotations.

As describe above, the knob 310 is an element directly held and rotated by a user and may have a specific shape which allows a user to easily grip the knob 310 for convenience in use.

The detachable member 320, which is a core element of the present invention which allows the side shield B to be coupled to the temple A of glasses, is separated from the knob 310 by the movement of the knob 310 so that the detachable member 320 is placed in the upper and lower wings D and E of the inserting member C and the inserting protrusion 400. In more detail, the detachable member 320 includes a lower inserting part 321 introduced into and restricted in the lower wing E of the inserting member C, an upper inserting part 322 introduced into and restricted in the upper wing D of the inserting member, and a screw part 323 disposed between the upper and lower inserting parts and engaged with the screw thread in the inserting protrusion 400.

In addition, the separation part 330, which is an element of the present invention which is separated by torsion by the rotation thereof, preferably has a thickness less than those of any other portions so that the detachable member 320 is easily separated from the knob 310.

That is, since a main point of the present invention is to remove an object, which allows the side shield to be conveniently fixed and installed to the glasses and is employed in a pin type in order to fix the side shield, in more easy and convenient scheme, to this end, the inserting protrusion 400, which has a screw thread formed on one surface of the temple A, is integrally formed on the temple A, the pin-detachment guide member 300 is introduced into an inner space of the upper and lower wings D and E which are disposed to overlap with the inserting protrusion in up and down directions such that the pin-detachment guide member 300 is screw coupled to the inserting protrusion 400 while the pin-detachment guide member 300 is sequentially introduced into the upper and lower wings, and the pin-detachment guide member, which is introduced into insides of the inserting member and the inserting protrusion 400, is separated by a continuous rotation operation of a user, so that a part thereof remains in the inserting part C and the inserting protrusion. Thus, the upper and lower wings of the inserting part are restricted to each other so that the side shield is coupled to the temple of glasses.

In this case, the inserting protrusion 400, which is means for screw coupling the pin-detachment guide member 300 of the present invention in order to couple the side shield B to the temple A, includes a coupling hole having a screw thread formed on the inside surface thereof. A diameter of the coupling hole is less than that of the lower inserting part 321.

Figure 6:
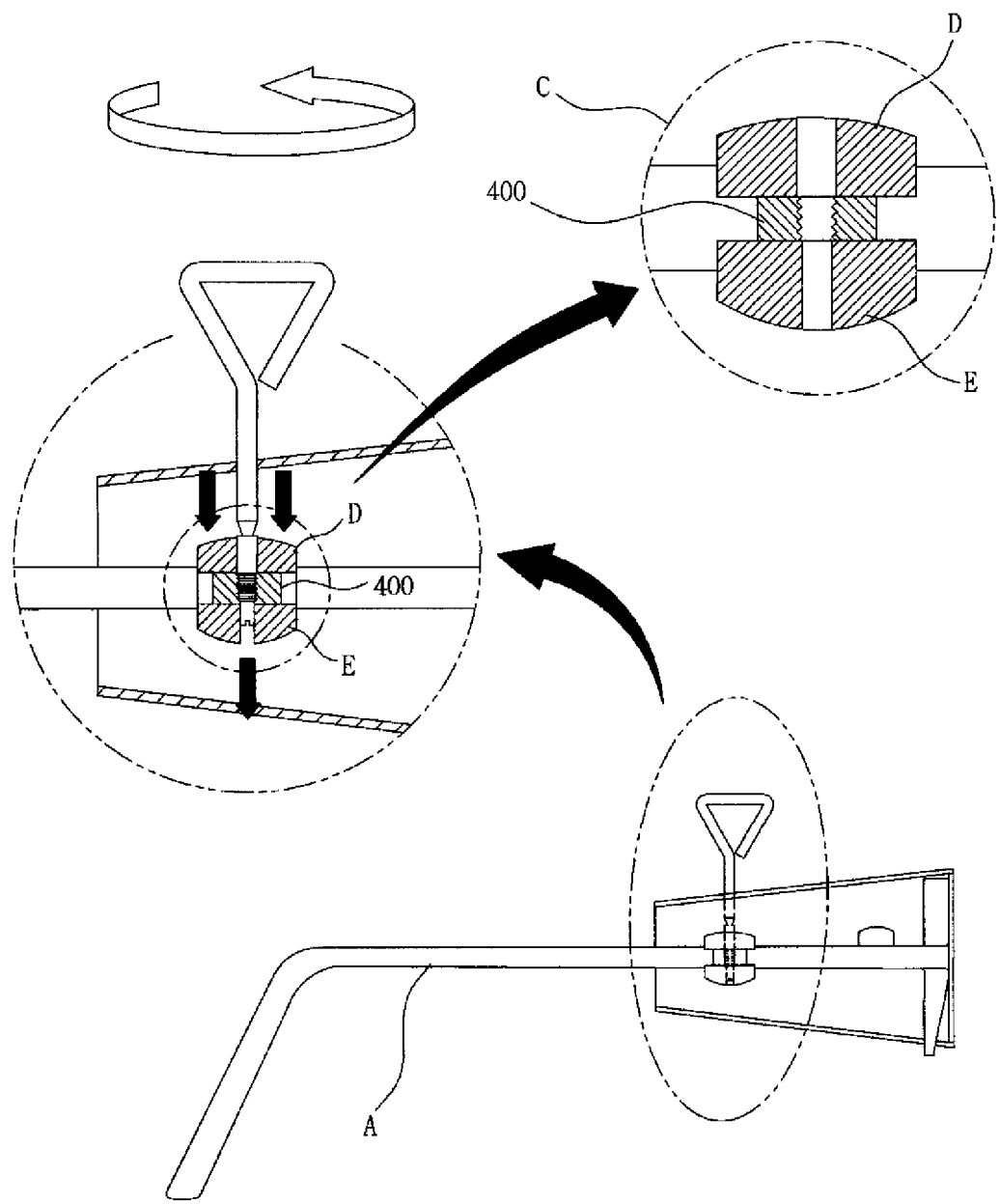
FIGS. 6 to 8 are schematic views illustrating states of using the pin-detachment guide member according to an embodiment of the present invention.
Figure 7:
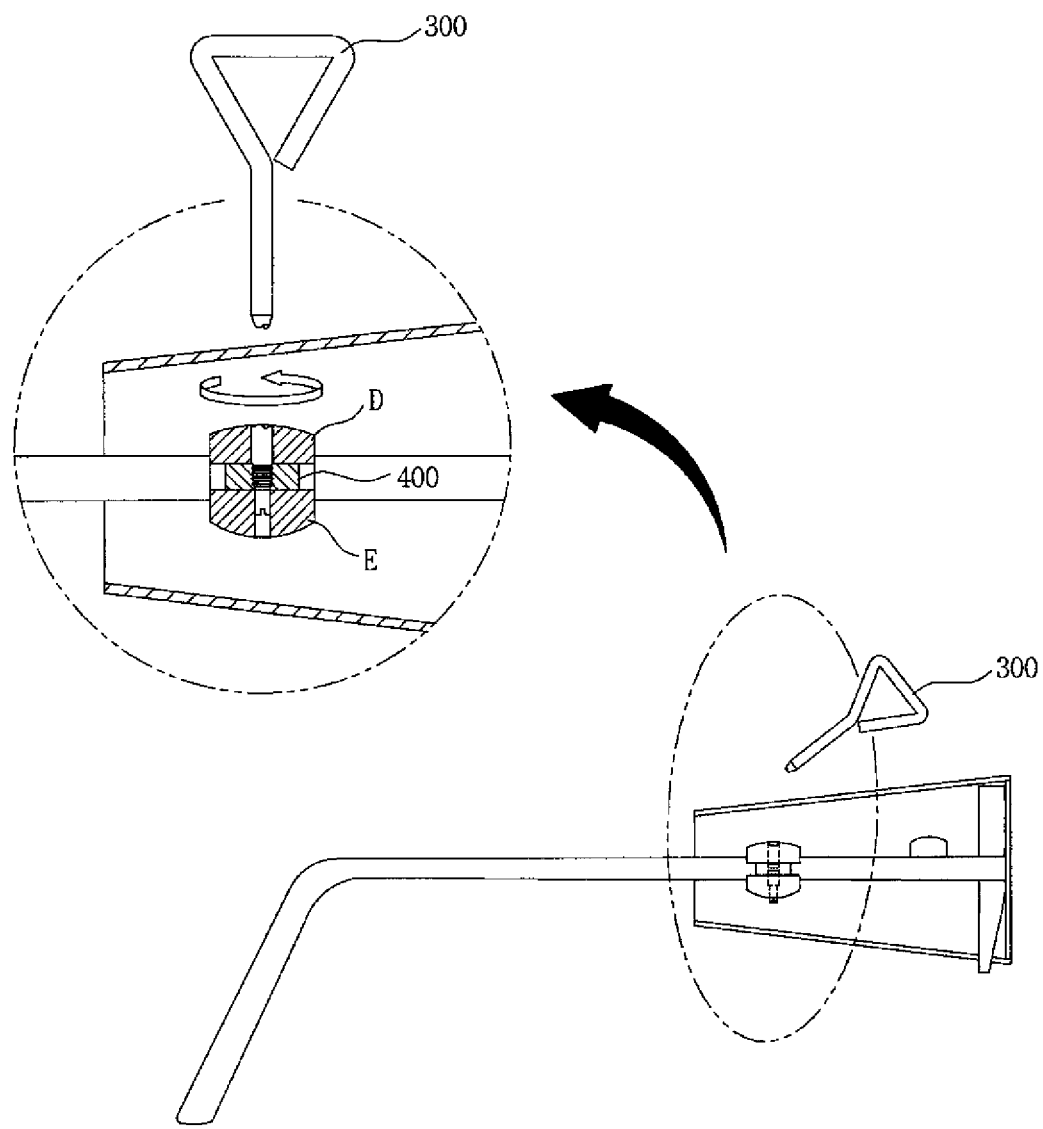
Figure 8:
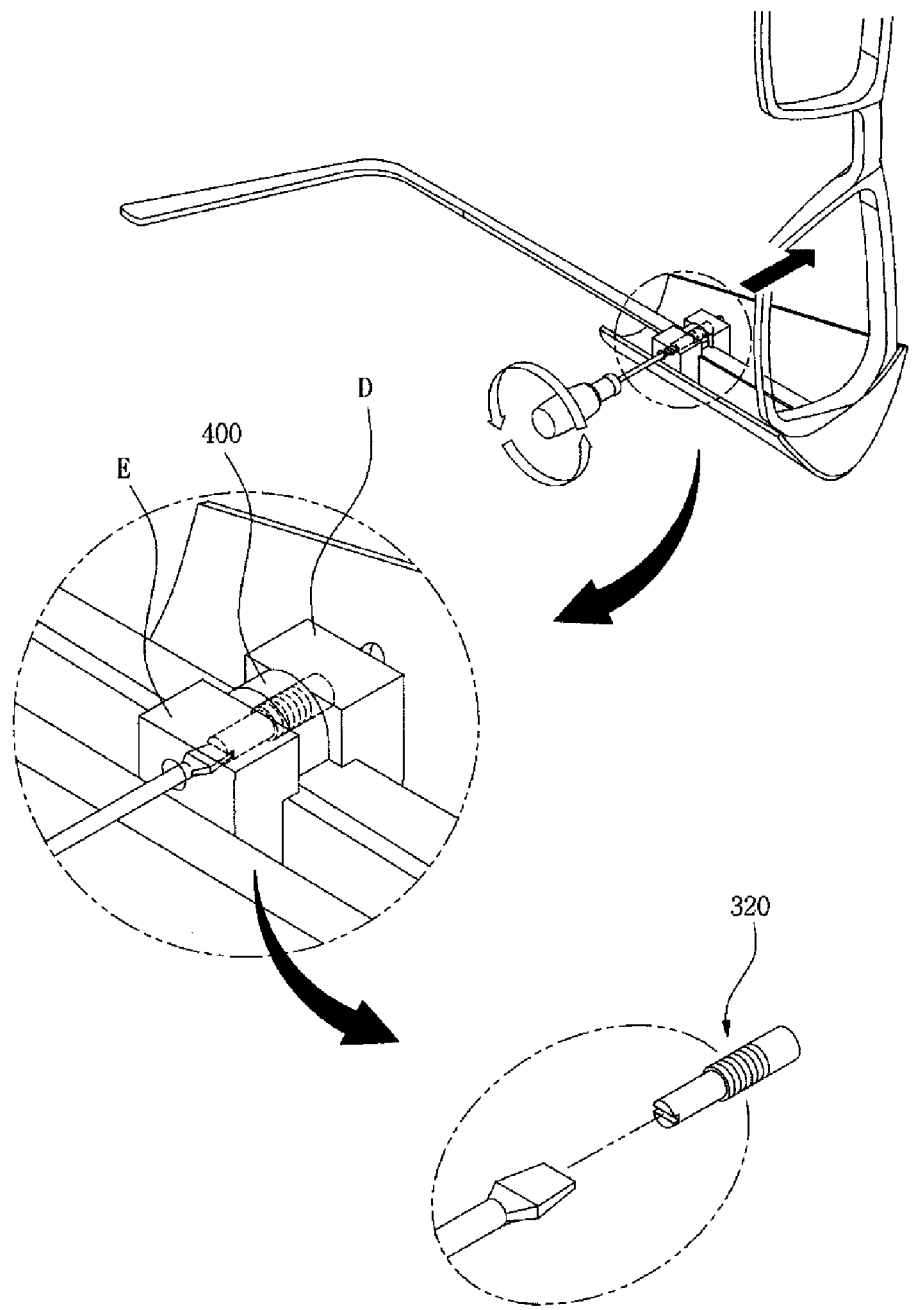

FIGS. 6 to 8 are schematic views illustrating states of using the pin-detachment guide member according to an embodiment of the present invention.

Hereinafter, the embodiment of the pin-detachment guide member 300 will be described with reference to the drawings.

First, when the pin-detachment guide member 300 is introduced into the upper wing D of the inserting member C, the upper inserting part 322 is placed in the upper wing D, the lower inserting part 321 is placed in the lower wing E and the screw part is placed in the inserting protrusion 400 which is interposed between the upper and lower wings D and E, so that the side shield is coupled to the temple. In this case, the lower inserting part 321 passes through the screw thread of the inserting protrusion to arrive at the lower wing E, so that the pin-detachment guide member 300 is coupled and fixed to the inserting member C of the side shield while the screw part 323 is engaged with the screw thread of the inserting protrusion 400.

Then, as the knob 310 is continuously rotated, the detachable member 320 is no longer rotated at the location at which the screw thread does not exist. The continuous rotation of the knob 310 induces the knob 310 to be rotated alone in a state that the detachable member 320 is fixed so that the knob 310 is separated due to inter-torsion.

Meanwhile, the operating groove 324 may be further provided on a bottom surface of the lower inserting part 321 in order to remove the detachable member 320 previously coupled. The operating groove 324 may have an 'I' shape or a cross shape.

The operating groove 324 signifies a groove into which a tool such as a conventional driver may be coupled. Thus, the previously assembled detachable member may be more easily removed from the side shield by using the operating groove.

Figure 9:
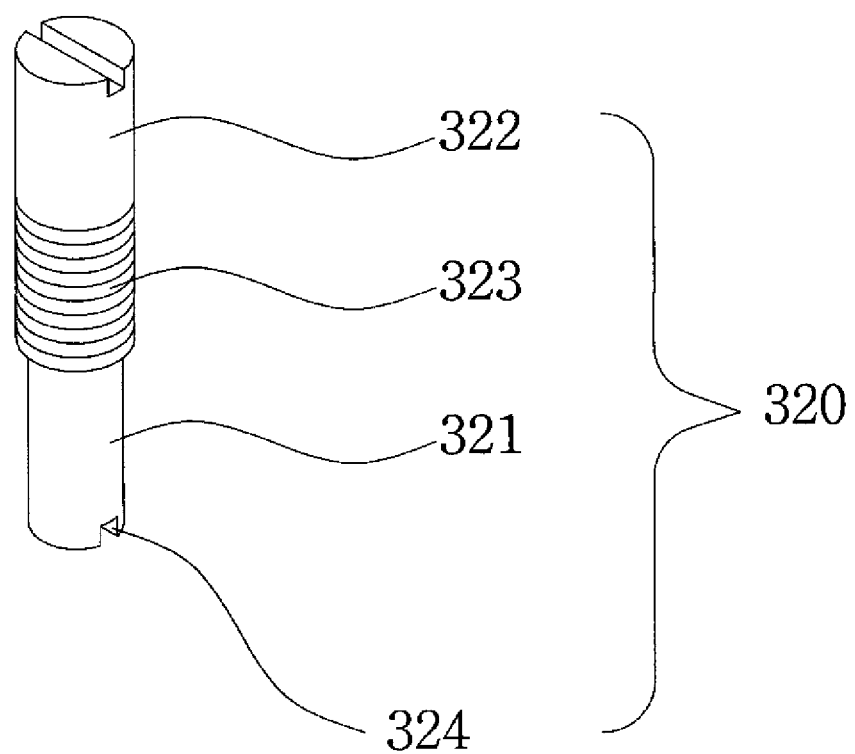
FIG. 9 is a perspective view showing a pin-detachment guide member for fixing a side shield according to another embodiment of the present invention.
Figure 10:
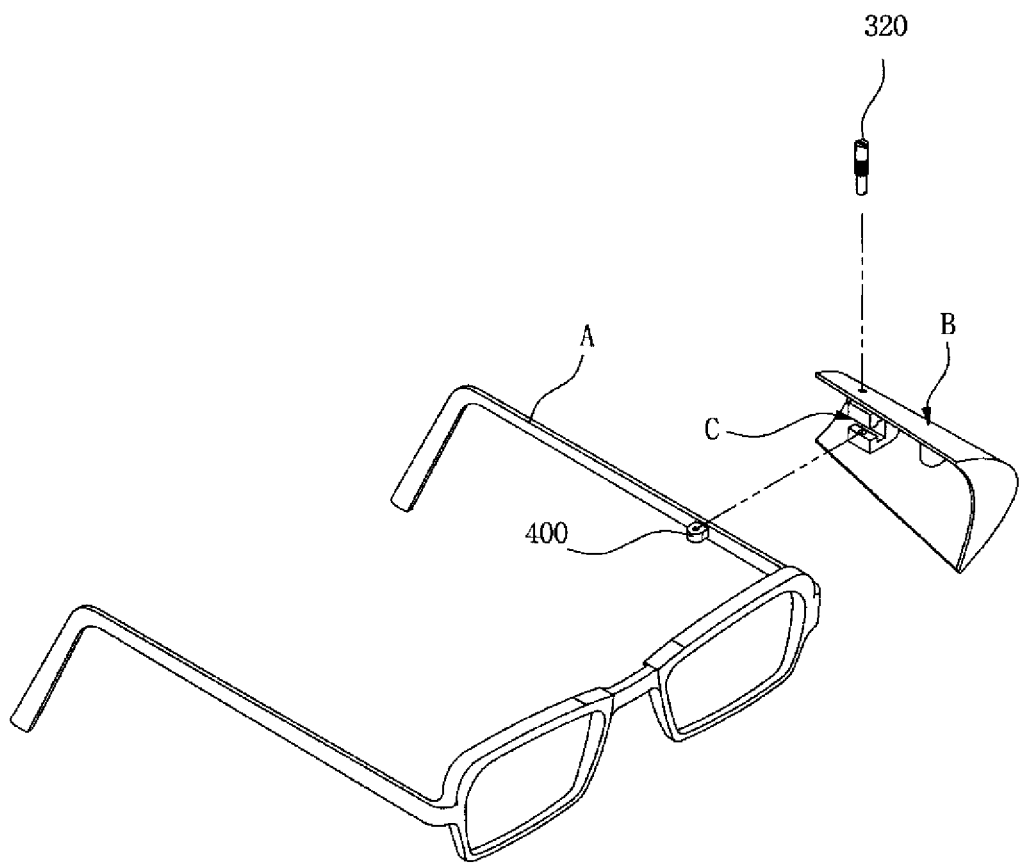
FIG. 10 is a view illustrating a state of using the pin-detachment guide member of FIG. 9.

FIG. 9 is a perspective view showing a pin-detachment guide member for fixing a side shield according to another embodiment of the present invention. FIG. 10 is a view illustrating a state of using the pin-detachment guide member of FIG. 9.

It can be confirmed from FIGS. 9 and 10 in which another embodiment of the pin-detachment guide member is depicted that the knob is enabled to be omitted.

That is, the pin-detachment guide member 300 of the present invention is introduced into an inner space of the upper and lower wings D and E which are disposed to overlap with each other in up and down directions of the inserting protrusion such that the pin-detachment guide member 300 is screw coupled to the inserting protrusion 400. To this end, although any reference numerals are not assigned, an operating box having the same type as that of the operating groove 324 may be further provided.

Such a configuration brings out the technical characteristics of the present invention in which the temple A and the side shield B are enabled to be fixed to or separated from each other by using the pin-detachment guide member 300, and allows the intended goal to be achieved in the state of excluding the knob 310 so that the configuration may be operated as another advantage.

According to the side shield fixing structure having a pin-detachment guide member of the present invention, due to the detachable structure of the knob and the detachable member, the side shield can be firmly fixed to the temple of glasses and when the knob is twisted, the detachable member is separated from the knob, so that the separated detachable member remains in the state that the detachable member is introduced into the inserting member of the side shield and the inserting protrusion, so the side shield can be more conveniently fixed to the temple of glasses. Specifically, according to the present invention, the coupled detachable member for fixing the side shield is detachable without difficulty due to the operating groove provided on the bottom surface of the detachable member. That is, the detachable member can be quickly detached by using the operating groove with a separated tool (such as a driver).

As a result, since the pin-detachment guide member for fixing aside shield according to the present invention allows the side shield to be conveniently installed to the temple and enables the detachable member previously installed to be separated, the pin-detachment guide member allows the side shield to be conveniently installed to glasses and the detachable member of a screw pin type, which is an object used to fix the side shield, can be more removed in a more easy scheme.

Although an exemplary embodiment of the present invention has been described for illustrative purposes with reference to the embodiments depicted in the drawings, those skilled in the art will appreciate that various modifications, additions and substitutions are possible, without departing from the scope and spirit of the invention as disclosed in the accompanying claims. In addition to variations and modifications in the component parts and/or arrangements, alternative uses will also be apparent to those skilled in the art.

What is claimed is:

1. A side shield fixing structure comprising:
   a pin-detachment guide member configured to be vertically coupled to a temple of glasses through an inserting member comprising an upper wing and a lower wing, and the inserting member is disposed inside a side shield and attached to the side shield, such that the side shield is fixed to the temple of glasses; and
   an inserting protrusion having a screw thread and attached to one surface of the temple of glasses,
   wherein the pin-detachment guide member is introduced into an inner space of the upper and lower wings, which overlap with each other in a vertical direction of the inserting protrusion, such that the pin-detachment guide member is screw-coupled to the inserting protrusion,
   wherein the pin-detachment guide member comprises:
   a rotatable knob;
   a detachable member configured to be detached and restricted in inner spaces of the upper and lower wings of the inserting member and the inserting protrusion as the knob is rotated; and
   a separation part interposed between the knob and the detachable member configured to be separated according to left and right torsions applied thereto,
   wherein the detachable member comprises:
   a non-threaded lower inserting part introduced into the lower wing of the inserting member and restricted in the lower wing;
   a non-threaded upper inserting part introduced into the upper wing of the inserting member and restricted in the upper wing; and
   a screw part disposed between the upper and lower inserting parts and engaged with the screw thread disposed in the inserting protrusion, and
   wherein the lower inserting part includes an operating groove located on a bottom surface thereof for removal of the detachable member from the inserting member.

2. The side shield fixing structure of claim 1, wherein a diameter of the upper inserting part is greater than a diameter of the lower inserting part, and
   wherein a diameter of the inner space of the upper wing corresponds to the diameter of the upper inserting part and a diameter of the inner space of the lower wing corresponds to the diameter of the lower inserting part, such that the diameter of the inner space of the upper wing is greater than the diameter of the inner space of the lower wing.

3. A side shield fixing structure comprising:
   a guide member configured to be vertically coupled to a temple of glasses through an inserting member comprising an upper wing and a lower wing, and the inserting member is disposed inside a side shield and attached to the side shield, such that the side shield is fixed to the temple of glasses;
   and an inserting protrusion having a screw thread and attached to one surface of the temple of glasses,
   wherein the guide member is introduced into an inner space of the upper and lower wings, which overlap with each other in a vertical direction of the inserting protrusion, such that the guide member is screw-coupled to the inserting protrusion,
   wherein the guide member is configured to be restricted in inner spaces of the upper and lower wings of the inserting member and the inserting protrusion, and
   wherein the guide member comprises:
   a non-threaded lower inserting part introduced into the lower wing of the inserting member and restricted in the lower wing;
   a non-threaded upper inserting part introduced into the upper wing of the inserting member and restricted in the upper wing; and
   a screw part disposed between the upper and lower inserting parts and engaged with the screw thread disposed in the inserting protrusion;
   wherein a diameter of the upper inserting part is greater than a diameter of the lower inserting part, and
   wherein a diameter of the inner space of the upper wing corresponds to the diameter of the upper inserting part and a diameter of the inner space of the lower wing corresponds to the diameter of the lower inserting part, such that the diameter of the inner space of the upper wing is greater than the diameter of the inner space of the lower wing.

* * * * *